United States Patent [19]
Wu et al.

[11] Patent Number: 5,784,215
[45] Date of Patent: Jul. 21, 1998

[54] METHOD AND APPARATUS FOR RECORDING AND READING VARIABLE SPEED DATA USING A ROTATING DRUM DEVICE

[75] Inventors: Tzong-Sheau Wu, Hsinchu; Tian-Rein Chen, Taipei; Rong-Dzung Tsai, Pingtung, all of Taiwan

[73] Assignee: Industrial Technology Research Institute, Hsinchu, Taiwan

[21] Appl. No.: 695,518

[22] Filed: Aug. 12, 1996

Related U.S. Application Data

[63] Continuation of Ser. No. 319,553, Oct. 6, 1994, abandoned.
[51] Int. Cl.$^6$ ........................................... G11B 5/00
[52] U.S. Cl. .................. 360/8; 360/64; 360/73.06; 386/109
[58] Field of Search ............ 360/8, 9.1, 10.1, 360/10.2, 10.3, 33.1, 36.1, 61, 64, 73.04, 73.06, 73.08; 358/335, 337, 338; 386/68, 80, 109

[56] References Cited

U.S. PATENT DOCUMENTS

| | | | |
|---|---|---|---|
| 4,594,621 | 6/1986 | Noguchi et al. | 360/77.14 |
| 4,837,641 | 6/1989 | Mori et al. | 360/32 |
| 5,045,954 | 9/1991 | Oishi et al. | 360/8 |
| 5,136,391 | 8/1992 | Minami | 358/310 |

*Primary Examiner*—Andrew L. Sniezek
*Attorney, Agent, or Firm*—Meltzer, Lippe, Goldstein, Wolf & Schlissel, P.C.

[57] ABSTRACT

A method and apparatus for recording and replaying variable speed data uses a rotating drum device. When information to be recorded is presented to the transfer rate of the information, be recorded is determined. If this information is not presented at a standard information transfer rate (N), it is converted to that standard rate. If the information not only is not at the standard rate N, but is outside a predetermined amount from that standard rate, the travel speed of the magnetic medium is slowed and the activation sequence of the magnetic recording head is altered. In the case where the information to be recorded is at a rate outside of the predetermined rate, the magnetic medium travel speed is reduced from the standard speed (L/T) in relation to the information transfer rate of the information to be recorded. If the tape speed is reduced to L/XT, then the activation sequence is every Xth head. During replay, the information is read from the medium at the standard information transfer rate and the medium travel speed and the head activation sequence are altered accordingly, if necessary. The information is then converted to the original information transfer rate by digital circuitry.

13 Claims, 7 Drawing Sheets

METHOD AND APPARATUS FOR RECORDING AND READING VARIABLE SPEED DATA USING A ROTATING DRUM DEVICE

This is a continuation of application Ser. No. 08/319,553, filed Oct. 6, 1994, now abandoned.

BACKGROUND OF THE INVENTION

1. Field of the Invention

The present invention is directed to a rotating drum device for recording and reading (or replaying) information on a media and, more particularly, to a method and structure for recording and reading variable speed data on a magnetic medium.

2. Description of the Prior Art

Rotating drum recording and reading devices are well known. Such devices are found in videotape recorders (VTRs) and digital audio tape players (DAT). Rotating drum recording devices are disclosed in U.S. Pat. No. 4,837,641 to Mori et al. and U.S. Pat. No. 5,045,954 to Oishi et al. The contents of these patents are incorporated herein by reference.

FIG. 1 represents a typical rotating drum device. such a device is typically cylindrically-shaped and includes a plurality of magnetic heads A,B,C,D. The drum rotates the heads so that one after the other, the heads contact the surface of a simultaneously moving magnetic recording medium, such as a VTR or DAT tape, which may wrap around the drum as much as 180°. A typical rotating drum has an even number of equally spaced apart heads. FIG. 1 shows a rotating drum 11 having, for illustrative purposes, four equally spaced heads A,B,C,D located at 90° intervals along the drum. The drum rotates in the direction shown by the arrow. As shown in FIG. 2, the drum 11 typically rotates at an angle with respect to the recording medium 12. Typically, the heads A,B,C,D are activated sequentially as they contact the surface of the magnetic medium 12. Because the medium 12 may partially wrap around the drum 11, as shown in FIG. 3, it is possible for two activated heads to simultaneously contact the tape at different locations for a period of time, as are heads A and B in FIG. 3.

FIG. 4 shows data recorded onto a tape 12 by a type of rotating drum reading and recording device known as a helical scanner. A helical scanner records data in tracks (shown in FIG. 4 as $A_{n-1}$ through $A_{n+1}$) obliquely formed in a longitudinal direction of the magnetic medium 12. Successive tracks have opposite azimuths, or angle of inclination (indicated in FIG. 4 by the hatchings across the tracks), and are read by rotating heads which also have opposite azimuths, or inclinations. In the drum shown in FIG. 1, heads A and C have a "plus azimuth" and heads B and D have an opposite "minus azimuth". Thus, heads A and C record tracks having a plus azimuth, and can read tracks having a plus but not a minus azimuth; and heads B and D record tracks having a minus azimuth, and can read tracks having a minus but not a plus azimuth.

FIG. 4 also shows the location of heads A and B (indicated by capital A,B on tracks $A_n$ and $B_n$, respectively) on the tape at a particular point in time. It is seen that at the time depicted in FIG. 4, head A is near the end of track $A_n$ and head B is near the center track $B_n$. Head C (not shown) is located near the beginning of track $C_n$. In the case of a helical scanner, even if head B physically contacts a portion of adjacent plus azimuth tracks $A_n$ or $C_n$, head B cannot read the data on these tracks because it has an azimuth opposite these tracks. FIG. 5 shows the head switch control signal for the rotating drum device of FIG. 1 (which is not necessarily a helical scanner). This shows which heads are activated at a given time. A' indicates that head A is activated. Likewise B', C', and D' indicate the time period that heads B', C', and D' are activated, respectively. Note the overlap between adjacent heads, indicating simultaneous recording or reading.

Information to be recorded and/or read from different sources may be presented at different rates. For example, a VTR tape may have different tape speeds, such as a high rate for a high definition television (HDTV) and a low rate for lower resolution television. A DAT tape may have both a high resolution and low resolution setting (corresponding to high and low data rates) for various applications; for example high resolution for computer usage and low resolution for audio usage. Recording/reproducing devices having a plurality of tape transport speeds are well known to those skilled in the art and are not further described. Therefore, there is a need for a rotating drum device which can record and read information presented at different information transfer rates.

Recording and reading variable rate information with a rotating drum device is known. Such a device is disclosed in the Mori et al. patent mentioned above. This device records and plays information at half the standard rate by reducing both the tape travel speed and the drum rotation speed. This method is impractical because it does not easily provide a wide range of variable data rates. Also, slowing the drum rotation speed reduces the magnetic head efficiency, resulting in a decreased signal quality. Slowing the drum rotation speed also increases the liklihood of drum vibration, which affects the signal quality. To compensate for the decreased signal quality during playback, the frequency characteristics of an RF equalizer circuit in the playback circuitry must be altered. This alteration is difficult and expensive, and therefore undesirable. Moreover, reducing the drum speed is further undesirable because the drum rotation speed is much greater than the tape speed (on the order of 1000 times greater), thus even a slight change in drum rotation speed will greatly affect the track angle along the medium. Also, when the recording bit rate is changed, a phased locked loop circuit in the playback circuitry must also be adjusted accordingly for proper playback, again resulting in increased complexity and cost.

Another rotating drum device capable of variable rate recording and reading is disclosed in the Oishi et al. reference mentioned above. The device disclosed in the Oishi et al. reference records and reads slower bit transfer rate data by slowing both the tape travel speed and the drum rotation speed when the information transfer rate is reduced no more than the inverse of the number of magnetic heads on the drum. That is, if the drum has four heads, the tape and drum speeds are reduced when the information transfer rate is greater than or equal to ¼th the standard rate. If the transfer rate is slower than ¼th the standard speed, the device enters a "DT mode", wherein the tape speed is reduced in an amount corresponding to the reduced transfer rate and a single magnetic head, referred to as the "DT head", records or reads the data at the slower rate. The drum makes an integral number of rotations across the medium while the position of the DT head on the drum changes. That is, if the data rate is between ¼ and ⅛ slower that the high speed transfer rate, the drum rotates four times as the medium moves the distance of one track so that the DT head contacts the medium four times in the distance of one track. Each time the DT head contacts the track, it is at a different location because its height has changed. The result is the DT head records four tracks of information on the medium. Neither the Mori et al. or Oishi et al. device is a helical scanner.

It is an object of the present invention to provide an improved rotating drum device for recording and reading information which may be presented at various information transfer rates which device requires no more than a minimum of hardware changes to existing devices and which makes efficient use of the magnetic recording medium surface area.

It is also an object of the invention to provide a variable speed rotating head device which does not change the drum rotation speed or recording bit rate.

It is another object of the invention to provide a variable speed rotating head device which does not necessitate undesirable alterations to the RF equalizer and phased locked loop; which does not require height variations for the magnetic heads; and permits the use of a helical scanner.

It is yet a further object of the present invention to provide a variable speed rotating head device which allows the recording and replay bitrates to be independent of each other.

SUMMARY OF THE INVENTION

When information to be recorded is presented to a device according to the present invention, the information's transfer rate is determined. If this information is not presented at a standard recording rate (N), it is converted to that standard rate. If the information is presented at a rate that deviates more than a predetermined amount from that standard rate, the travel speed of the magnetic medium and the activation sequence of the magnetic recording head on the rotating drum are altered. In the case where the information to be recorded is presented at a rate less than the predetermined amount from the standard rate, the magnetic medium travel speed is reduced from the standard speed (length/time or L/T) in relation to the information transfer rate of the information to be recorded. The rotating drum device rotation speed is not changed. In order to use efficiently the surface of the magnetic medium, the heads on the rotating drum are activated in a sequence relating to the medium speed reduction. That is, if the medium speed is reduced to L/T·1/X (i.e., L/XT), where 1/X is the amount the speed is reduced, then the activation sequence is every Xth head.

In the case of a helical scanner where recorded tracks must have alternating azimuths, the relationships of the medium speed reduction and head activation sequence involve odd numbers, that is, X is an odd integer. For example, if the medium speed is reduced from L/T to L/3T, then the activation sequence activates every third magnetic head. In the illustrative example of FIG. 1 showing four heads A,B,C,D, the activation sequence would be A,D,C,B.

During replay, because the information was recorded at the rate N, the drum head rotation speed does not need to be reduced. The medium speed and head activation sequence are altered in a manner similar as described above. The information is read from the medium at the standard information transfer rate (N) and later may be altered to the original information transfer rate or another transfer rate by digital circuitry or output at the standard rate.

BRIEF DESCRIPTION OF THE DRAWINGS

These and other objects and features of the present invention will become apparent from the following detailed description in conjunction with the following drawings, wherein.

DETAILED DESCRIPTION OF A PREFERRED EMBODIMENT

The present invention is an improvement in a standard rotating drum recording/reading device. The detailed embodiment described below is directed to a helical scanner having four heads, but it is apparent to a person skilled in the art that the present invention is easily adapted for use with a rotating drum device which does not use the helical scanning method or which has more or less than four heads.

Figure 6:
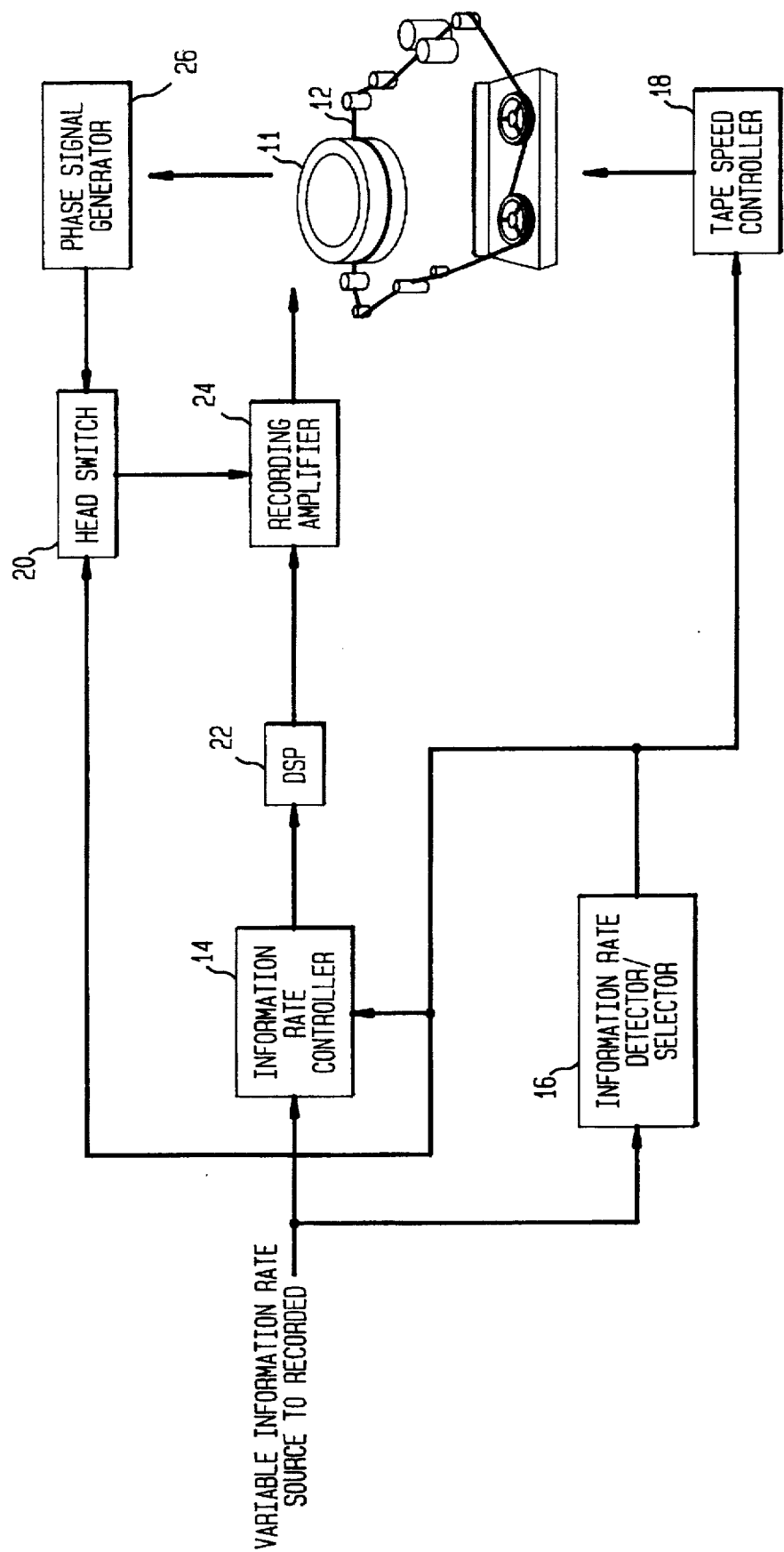
FIG. 6 is a block diagram of a recording circuitry according to one embodiment of the present invention.

FIG. 6 is a block diagram of one embodiment of the present invention. FIG. 6 illustrates a system 10 for recording information onto the magnetic medium 12 via the magnetic recording heads A,B,C,D which are located on the rotating drum 11. Thus, the system 10 is located generally between an information input 9 and the rotating head drum 11. In a VTR, for example, the recording system 10 is found between the antenna or cable input and the recording heads which contact a VTR tape.

The information to be recorded on the magnetic medium 12 is applied to an information rate controller 14 and an information rate detector/selector 16. In this preferred embodiment, the standard information transfer rate is also the highest recording information transfer rate and referred to as N (bits/second)

The information rate detector/selector 16 detects the information transfer rate of the information source. This rate is referred to herein as "the source information rate." The information rate detector/selector 16 outputs transfer rate selection signals which are applied to the information rate controller 14; the variable tape speed controller 18, which controls the travel speed of the magnetic recording medium 12; and the head switch 20, which controls the head functions.

The information rate controller 14 converts the variable information rate source data into information with a recording rate N using a conventional rate conversion technique such as adding redundant bits. The information rate controller outputs the source information at rate N to the digital signal processor (DSP) 14.

The DSP 14 performs functions well known to those skilled in the art to record this information onto a magnetic medium. These functions include encoding, modulating, and error control coding. Because these functions are well known and are not necessary to understand the operation of the present invention, discussion of them is omitted. The DSP 22 applies the processed information to a recording amplifier 24. The recording amplifier also receives the output of the head switch 20. The recording amplifier sends the information to the magnetic heads A, B,C,D on the rotating drum 11 to be recorded on the magnetic medium 12.

The phase signal of the magnetic drum 11 is generated by the phase signal generator 26. The phase signal is applied to the head switch 20 to determine the location of the magnetic heads A,B,C,D with respect to the magnetic medium 12.

Figure 7:
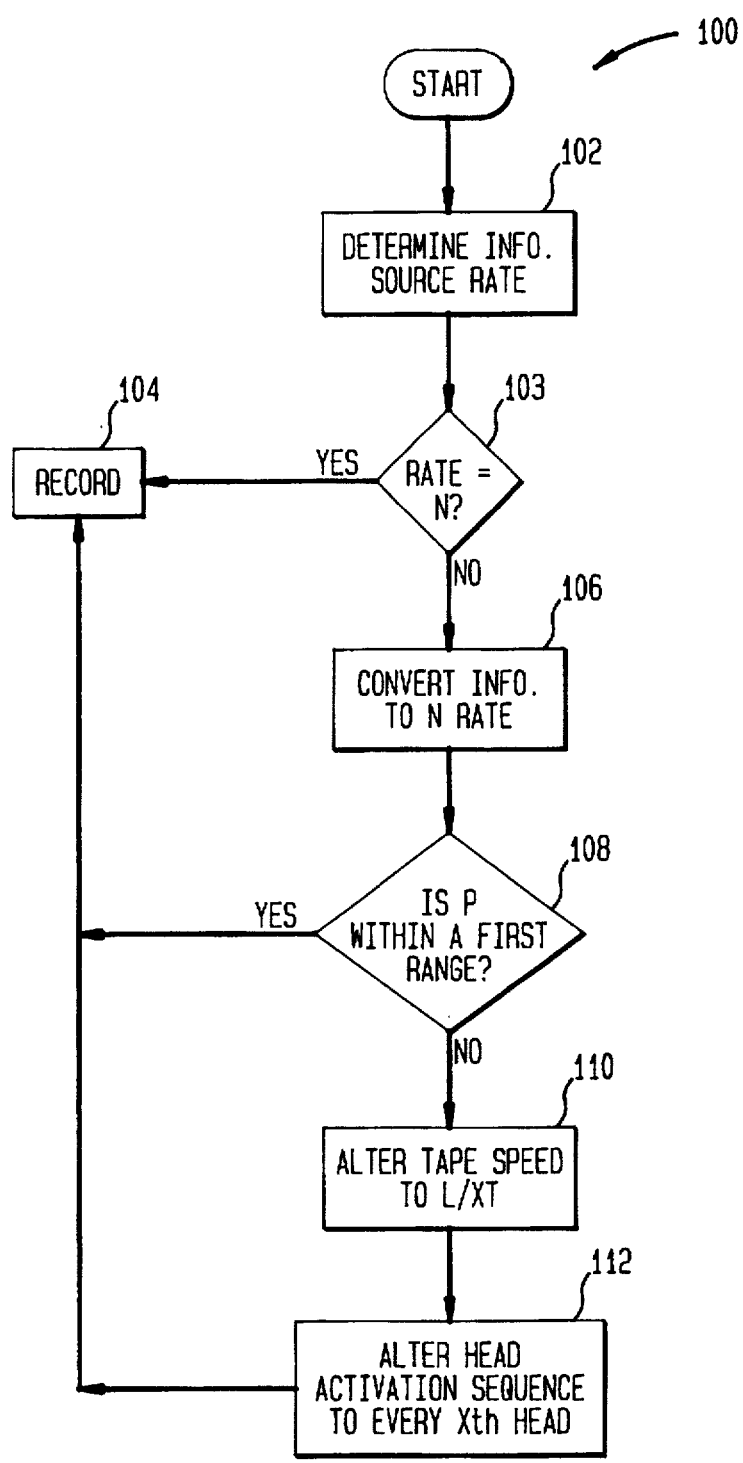
FIG. 7 is a flow chart of the recording process according to the present invention.

FIG. 7 is a flow chart of the process 100 performed by the recording system 10. The information rate detector 16 determines the source information rate P of the information to be recorded (step 102). If P is within a first range of numbers close to a standard recording rate N (typically the highest recording rate), for example, where:

$$N/3 < P \leq N; \quad \text{(Eq. 1)}$$

where magnetic drum rotation cycle=T sec.;
magnetic medium length=L mm; and
magnetic medium speed=L/T mm/sec the information is recorded in the manner similar to the ordinary manner for a rotating drum recording device.

Figure 1:
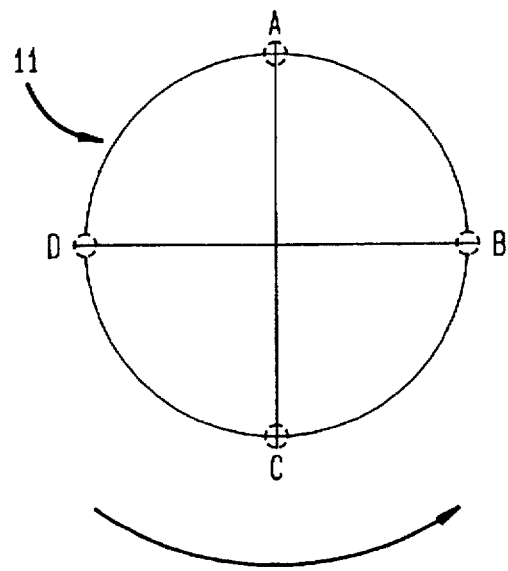
FIG. 1 represents a rotating drum having four magnetic heads.
Figure 2:
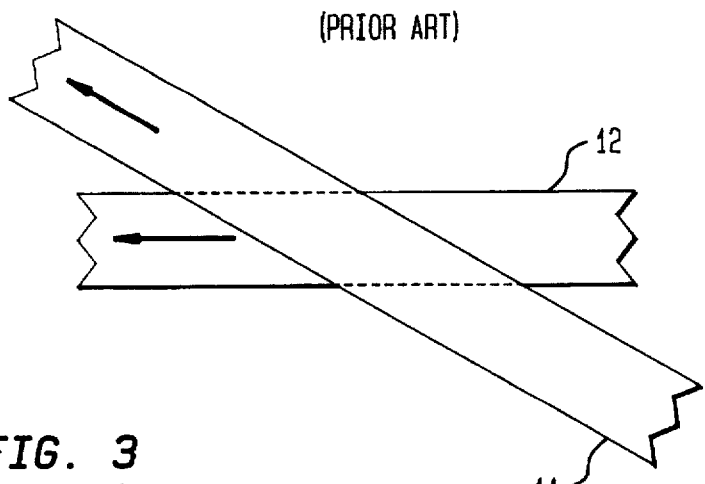
FIG. 2 is a front elevational view of a rotating drum and recording medium.
Figure 3:
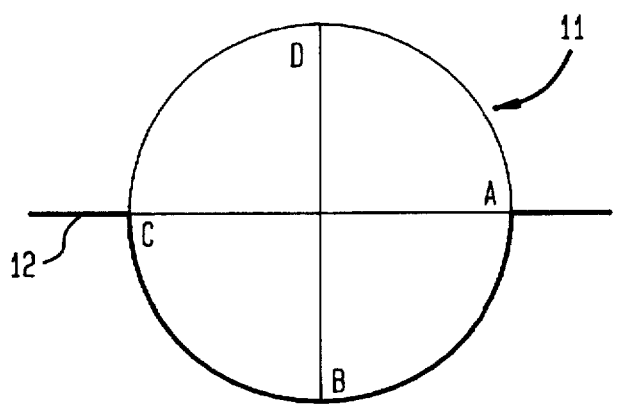
FIG. 3 represents a top view of a rotating drum and recording medium.
Figure 4:
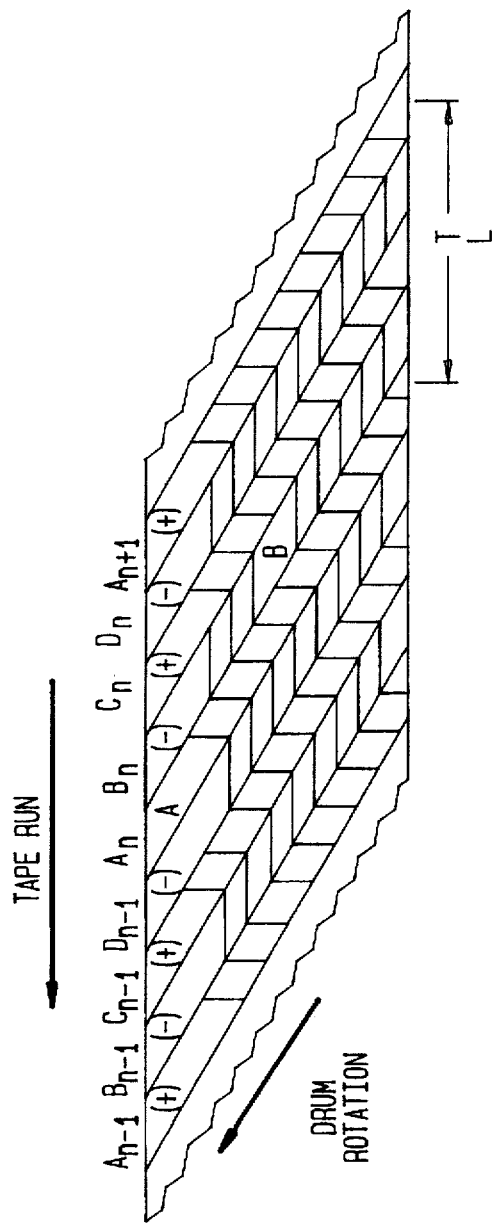
FIG. 4 represents tracks of information recorded by a helical scanner operating at a high information transfer speed onto a magnetic medium.
Figure 5:
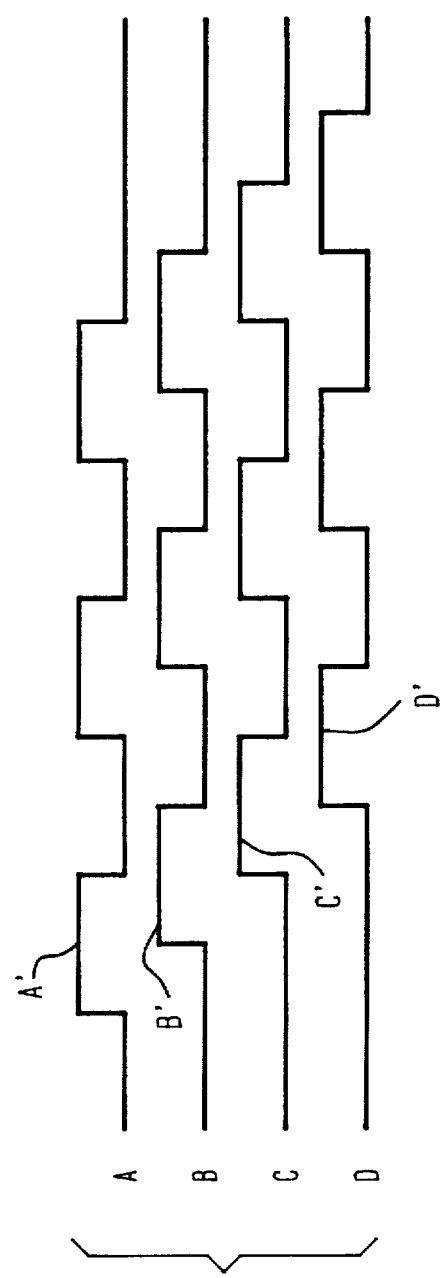
FIG. 5 is a chart showing the head switch control signal of the rotating drum device shown in FIG. 1 at a high information transfer speed.

Specifically, in the case where the source information rate P equals the standard rate N (step 103), the transfer rate need not be altered and the information is recorded (step 104). If P<N (step 103), the information rate detector/selector 16 instructs the information rate controller 14 to raise the information transfer rate to N bits/sec (step 106). When the detector 16 determines that P is close to N (for example, when P is within the first range defined by Eq. 1) (step 108), the device functions in a manner similar to normal speed recording and the information is recorded (step 104). It should be noted that when P<N and is close to N, the portion of the magnetic track length having recorded information is P/N less than the track length when P=N and the unused track length (1−(P/N))·(total track length) of the magnetic track is left blank. The variable tape speed controller 18 maintains the magnetic medium 12 travel speed at the normal speed (L/T). The head switch 20 activates the magnetic heads sequentially (here A,B,C,D) as shown in FIG. 5. That is, in the embodiment shown in FIG. 1, each head is activated one after the other each time the drum completes a 90° rotation.

When the information rate detector 16 determines that the source information rate P, is not in the first range (step 108), the information is not recorded in the ordinary manner. For example, P may be in a second range:

$$N/5 < P < N/3, \quad \text{(Eq. 2)}$$

where magnetic drum rotation cycle=T sec.;
magnetic medium length=L mm, and;
magnetic medium speed=L/3T mm/sec.

Figure 8:
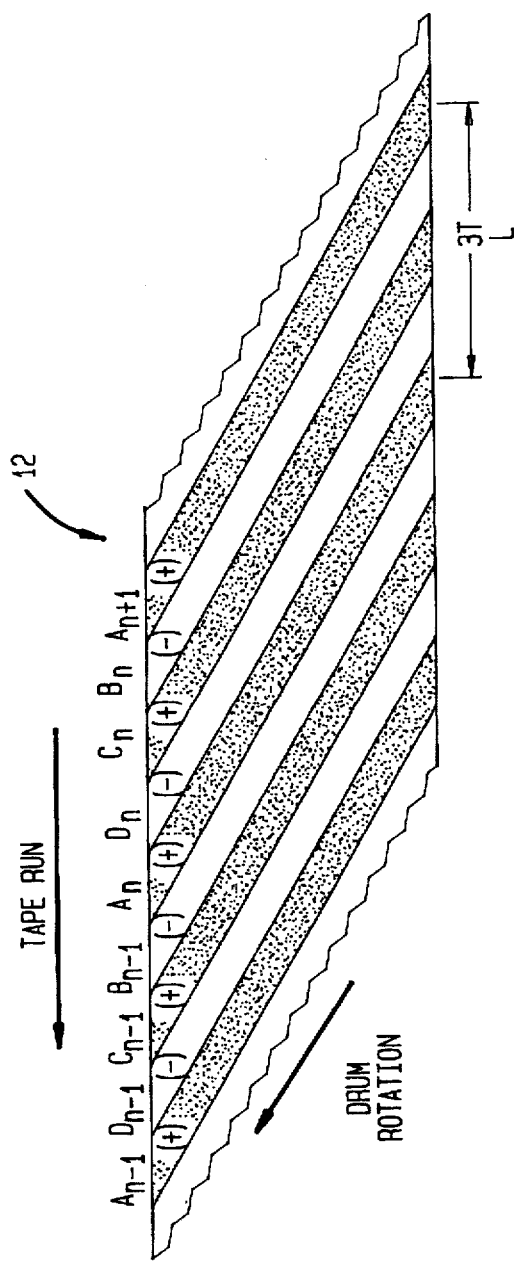
FIG. 8 represents tracks of information recorded by a helical scanner operating at a slower information transfer speed onto a magnetic medium according to one embodiment of the present invention.

In this case, the tape speed controller 18, in response to the transfer rate detection signal, reduces the magnetic medium travel speed (step 110) to L/3T (in this example), that is, one-third the normal speed. The drum 11 rotates at the same speed, but the head activation sequence is altered (step 112). Because in this example the travel speed has been reduced to one third the normal speed, the head switch 20 will activate every third head. Thus, recording (step 114) occurs as follows. When plus azimuth track $A_n$ contacts the drum, head A is activated. When the adjacent minus azimuth track appears on the drum, head B, the adjacent minus head, is not activated, nor is the following positive head C. Because the tape has been slowed down by a factor of 3, the drum rotates, in this example, 270° and the third head after A is activated. Thus, minus azimuth head D is activated by the head switch 20. Because the tape speed is reduced, when head A completes recording data, head B will contact the magnetic medium 12 and will be physically located on track A. Thus, head B should be masked. Head C will also physically contact track A and should be masked when it contacts the medium 12. When head D contacts the medium 12, the medium has travelled a sufficient length so it can record without covering (or overwriting) the information on track A. This allows efficient use of the medium's recording area. As shown in FIG. 8, there is no appreciable gap between adjacent tracks in this example.

Because the recording bit rate is always N bits/sec., during playback there is no need to change the phased locked loop and RF equalizer circuit which are located in the playback circuitry.

Figure 9:
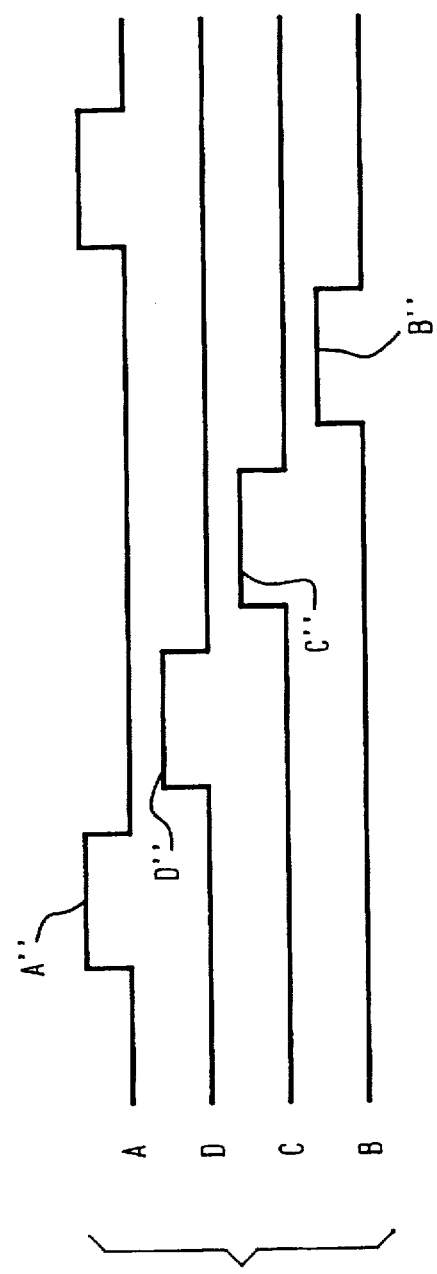
FIG. 9 is a chart showing the head switch control signal of the rotating drum device shown in FIG. 1 at a low information transfer speed according to one embodiment of the present invention.

FIG. 8 shows the tracks recorded by a helical scanner in the manner described above where P is within a second range of numbers, such Equation 2 as in above, P=N/3. Note that in this illustrative embodiment, the track adjacent to $A_n$ is $D_n$. Likewise, the next plus azimuth track was recorded by the third head after head D, which is head C. The following minus azimuth track was recorded by the third head after head C, which is head B. The head switch 20 sequence for this example is A,D,C,B, and is illustrated in FIG. 9. A", D", C", and B" indicate the time period that each head is activated.

It is apparent that other relationships between the tape speed and the head activation sequence are possible. For example, if the source information rate P falls within a particular range which may include, for example, P=N/5, the heads could be activated in intervals of five. In this exemplary embodiment having a drum with four heads, the sequence would be A,B,C,D. However, the four headed drum shown in this embodiment would complete a 450° rotation (i.e., 360°+90°) before head B is activated. If P falls within a particular range which may include, for example, P=N/7, every seventh head would be activated and the sequence would be A,D,C,B, but the drum would rotate 630° (i.e., 360°+270°) before the next head is activated. Of course, the invention is not limited to a drum having four heads.

The relationships described above involve odd numbers in tape speed reduction (e.g., L/3T or L/5T or L/7T) because the exemplary embodiment is a helical scanner having an even number of heads. Because of the plus and minus azimuths, each subsequent activated head must have the opposite azimuth of the preceding head, thus, the intervals must be odd numbers. In the case of a rotating drum device which does not consider opposite azimuths, the relationships may be either even or odd. For every fraction of L/T that the tape is slowed, the inverse of that fraction relates to the head activation sequence. For example, where the tape speed is reduced to L/XT, then the activation sequence is every Xth head.

Figure 10:
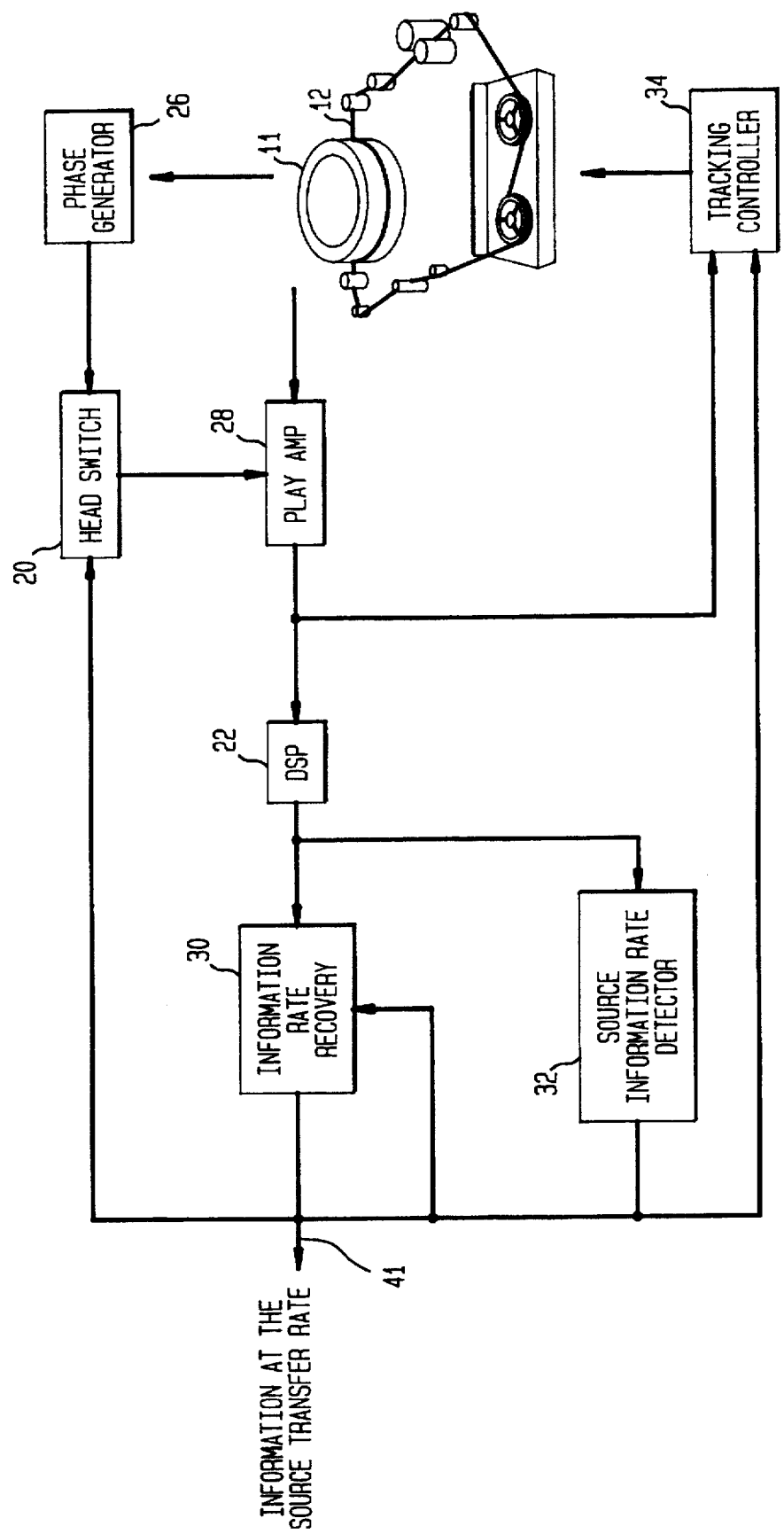
FIG. 10 is a block diagram of a replay circuitry according to one embodiment of the present invention mode.
Figure 11:
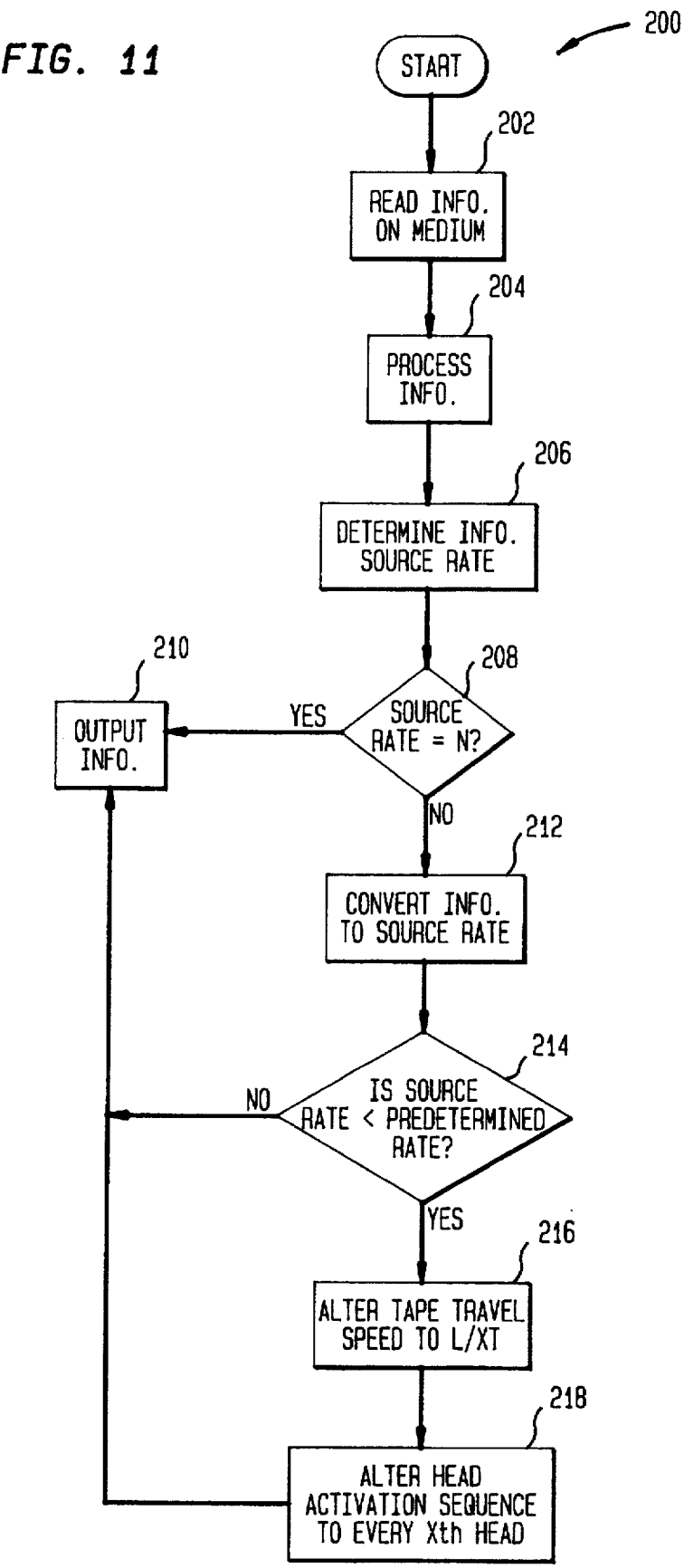
FIG. 11 is a flow chart of the replay process according to the present invention.

FIG. 10 is a block diagram of one embodiment of the replay system 40 of the rotating drum device according to the present invention. FIG. 11 is a flow chart of the process (200) performed by the replay system 40. This circuitry 40 is necessary to replay the information read from the magnetic medium 12 by the magnetic heads A,B,C,D on the rotating drum 11. For example, in a VTR the replay circuitry 40 is generally located between the play heads which contact a VTR tape and the VTR output 41 to a television set.

Referring to FIG. 10, phase signal generator 26 generates a phase signal of the magnetic drum 11. This signal is applied to the head switch 20 to determine the location of the magnetic heads A,B,C,D with respect to the magnetic medium 12. The information to be read by the heads is applied to a play amplifier 28. As described above, even information that was presented with a source information rate having a rate less than N, is recorded at the recording rate N, there is no need to adjust drum rotation speed.

The play amplifier 28 also receives the output of the head switch 20, which controls activation of the magnetic heads. The play amplifier reads the information (step 202 in FIG. 11) from the medium and sends it to the DSP 22. The DSP processes the information (step 204) from a magnetic medium. This processing is well known to those skilled in the art and is not discussed here. Because the information was recorded at the standard rate N, the information may be output at the standard rate or may be converted back to the original playback rate or to another source rate which may be different from the original recording rate (step 205). To convert the infomation to a desired rate, the DSP output is applied to a source information rate detector 32 which determines the source information rate (steps 208, 214) and generates a control signal. The DSP 22 output is also applied to an information rate recovery device 30 which, in response to the output signal of the source information rate detector 32 outputs the information unaltered if the source rate was N (step 210) or converts the recorded information to its original transfer rate (step 212) before the information is output (step 210).

The source information rate detector 32 control signal and a signal from the play amplifier 28 are applied to a conventional tracking controller 34, which alters the medium speed in accordance with the source information rate required for playback (step 216).

The source information rate detector 32 control signal and the output of the phase generator 26 are applied to the head switch 20. The control signal instructs the head switch 20 to activate the magnetic heads in the proper sequence (step 218), according to the medium speed. Preferably, unused heads are masked during replay because information from the active head is needed for the tracking control. The phase generator output indicates the location of the magnetic heads with respect to the magnetic medium.

The present invention is not limited to the disclosed embodiment, but rather various modifications, substitutions, and equivalent structures may be used without departing from the scope of the present invention.

What is claimed is:

1. An apparatus for transferring information between a rotating drum device, the device having a rotation speed and an even number of magnetic heads, and a magnetic medium, comprising:
    i) an input;
    ii) an information transfer rate detector connected to the input;
    iii) a medium travel speed controller connected to the information transfer rate detector, the speed controller configured to control a speed of the magnetic medium in relation to an amount from which a detected information transfer rate is less than a standard transfer rate; and
    iv) a magnetic head switch connected to the information rate detector and configured to activate the magnetic heads so that every Xth head is activated, where X is an odd integer and relates to the amount from which the source information transfer rate is less than the standard transfer rate without changing the drum rotation speed.

2. The apparatus of claim 1, wherein the medium travel speed controller is further configured to:
    (i) not alter the speed from a standard speed L/T, where L is a tape length and T is a rotation cycle of the rotating drum device, when the source transfer rate is between a first predetermined transfer rate and a slower second predetermined transfer rate; and
    (ii) alter the speed when the information transfer rate is slower than the second predetermined transfer rate, the speed being altered to a fraction L/XT of the standard speed L/T.

3. The apparatus of claim 1, further comprising:
    i) an information rate controller connected to the input and the information rate detector, the information rate controller configured to convert the information to be recorded from the source transfer rate to a predetermined transfer rate;
    ii) a single processor connected to the information rate controller; and
    iii) a phase single generator connected between the rotating drum device and the magnetic head switch, the phase signal generator configured to indicate the location of at least one rotating drum head with respect to the magnetic medium.

4. The apparatus of claim 3, further comprising a playback circuit, including:
    i) a playback amplifier having an input connected to the rotating drum device and the head switch and an output connected to the signal processor;
    ii) a source information rate detector having an input connected to the signal processor and an output connected to the head switch;
    iii) an information rate recovery device connected to an output of the signal processor and an output of the source information rate detector;
    iv) a tracking controller having an input connected to a play amplifier and the source information rate detector and an output connected to the rotating drum device; and
    v) recovered information output connected to an output of the information rate recovery device.

5. The apparatus of claim 4, further including phase signal generator having an input connected to the rotating drum device and an output connected to the head switch.

6. The apparatus of claim 1, where the rotating drum device comprises a helical scanner, wherein adjacent heads being configured to transfer information at opposite azimuths.

7. The apparatus of claim 1, wherein each of the plurality of magnetic heads is fixed at a particular height with resect to the magnetic medium.

8. The apparatus of claim 1, wherein the drum rotates at a single rotation speed regardless of the detected information transfer rate.

9. A method for controlling an information transfer rate of a rotating drum device having a particular standard rotation speed, a particular standard medium speed, and an even number of magnetic heads connected to the drum, the method comprising the steps of:

a. determining a source transfer rate of information to be recorded onto a medium;

b. if the source transfer is determined to be a standard transfer rate, maintaining the standard rotation speed and the standard medium speed, and successively activating each of the magnetic heads; and c. if the source transfer rate is determined to be less than the standard transfer rate, then:
   i. controlling a speed of the medium based on the determined source transfer rate without changing the drum rotation speed; and
   ii. sequentially activating every Xth magnetic head on the rotating drum in an activation sequence related to the speed of the drum, where X is an odd integer.

10. The method of claim 9, wherein the step of controlling speed of the medium further comprises:

i) when the determined source transfer rate is between recording rate N and a second predetermined transfer rate slower than N, not altering the speed of the medium from a standard speed L/T, where L represents a tape length and T represents a rotation cycle of the rotating drum device, and ii) when the source transfer rate is slower than the second predetermined transfer rate, altering the speed of the medium to a fraction of the standard speed, said fraction being L/XT, where X relates to an amount from which the source information transfer rate varies from the standard transfer rate, wherein the activation sequence is every Xth head, where X equals 1 where the speed is not altered.

11. The method of claim 10, further comprising selecting the second predetermined rate to be N/3.

12. The method of claim 10, wherein the rotating drum device comprises a helical scanner, wherein adjacent heads being configured to transfer information at opposite azimuths.

13. The method of claim 9, wherein playback of information recorded onto the medium comprises the steps of:

i) reading the recorded information from the medium at the standard transfer rate;

ii) determining a replay source transfer rate;

iii) altering speed of the medium and magnetic head activation sequence according to replay source transfer rate; and iv) converting the information read from the medium from the standard transfer rate to the replay source transfer rate.

* * * * *